May 7, 1968 W. G. PETTITT 3,382,485

MULTIPLE STATION CODE COMMUNICATION SYSTEM

Filed Oct. 14, 1963 7 Sheets-Sheet 1

INVENTOR.
W. G. PETTITT
BY Forest B. Hitchcock
HIS ATTORNEY

INVENTOR.
W. G. PETTITT
BY Forest B. Hitchcock
HIS ATTORNEY

MULTIPLE STATION CODE COMMUNICATION SYSTEM

Filed Oct. 14, 1963 7 Sheets-Sheet 3

May 7, 1968 W. G. PETTITT 3,382,485

MULTIPLE STATION CODE COMMUNICATION SYSTEM

Filed Oct. 14, 1963 7 Sheets-Sheet 4

INVENTOR.
W.G.PETTITT
BY
Forest B. Hitchcock
HIS ATTORNEY

May 7, 1968 W. G. PETTITT 3,382,485

MULTIPLE STATION CODE COMMUNICATION SYSTEM

Filed Oct. 14, 1963 7 Sheets-Sheet 5

MULTIPLE STATION CODE COMMUNICATION SYSTEM

Filed Oct. 14, 1963 7 Sheets-Sheet 6

INVENTOR.
W. G. PETTITT
BY Forest B. Hitchcock
HIS ATTORNEY

FIG. 4

| STATION NO. | MATRIX 43 TERMINAL NO. | MATRIX 44 TERMINAL NO. |
|---|---|---|
| 1 | 2 | 1-7 |
| 2 | 3 | 1-7 |
| 3 | 4 | 1-7 |
| 4 | 5 | 1-7 |
| 5 | 6 | 1-7 |
| 6 | 7 | 1-7 |
| 7 | 8 | 1-7 |
| 8 | 1 | 8-15 |
| 9 | 2 | 8-15 |
| 10 | 3 | 8-15 |
| 11 | 4 | 8-15 |
| 12 | 5 | 8-15 |
| 13 | 6 | 8-15 |
| 14 | 9 | 8-15 |
| 15 | 8 | 8-15 |
| 16 | 1 | 16-23 |

INVENTOR.
W. G. PETTITT
BY
Forest B. Hitchcock
HIS ATTORNEY 3,382,485
MULTIPLE STATION CODE COMMUNICATION SYSTEM Walter G. Pettitt, Rochester, N.Y., assignor to General Signal Corporation, Rochester, N.Y., a corporation of New York Filed Oct. 14, 1963, Ser. No. 315,760
5 Claims. (Cl. 340—163)

ABSTRACT OF THE DISCLOSURE

A code communication system for communicating indication codes from a plurality of field stations over a communication channel to a control office, each station having a chance to transmit when called by station roll call pulses transmitted from the control office. Each station has a binary counter for counting the roll call pulses having first and second groups of stages controlling respectively first and second inhibit matrices for jointly determining when the associated field station can transmit.

Figure 1A:
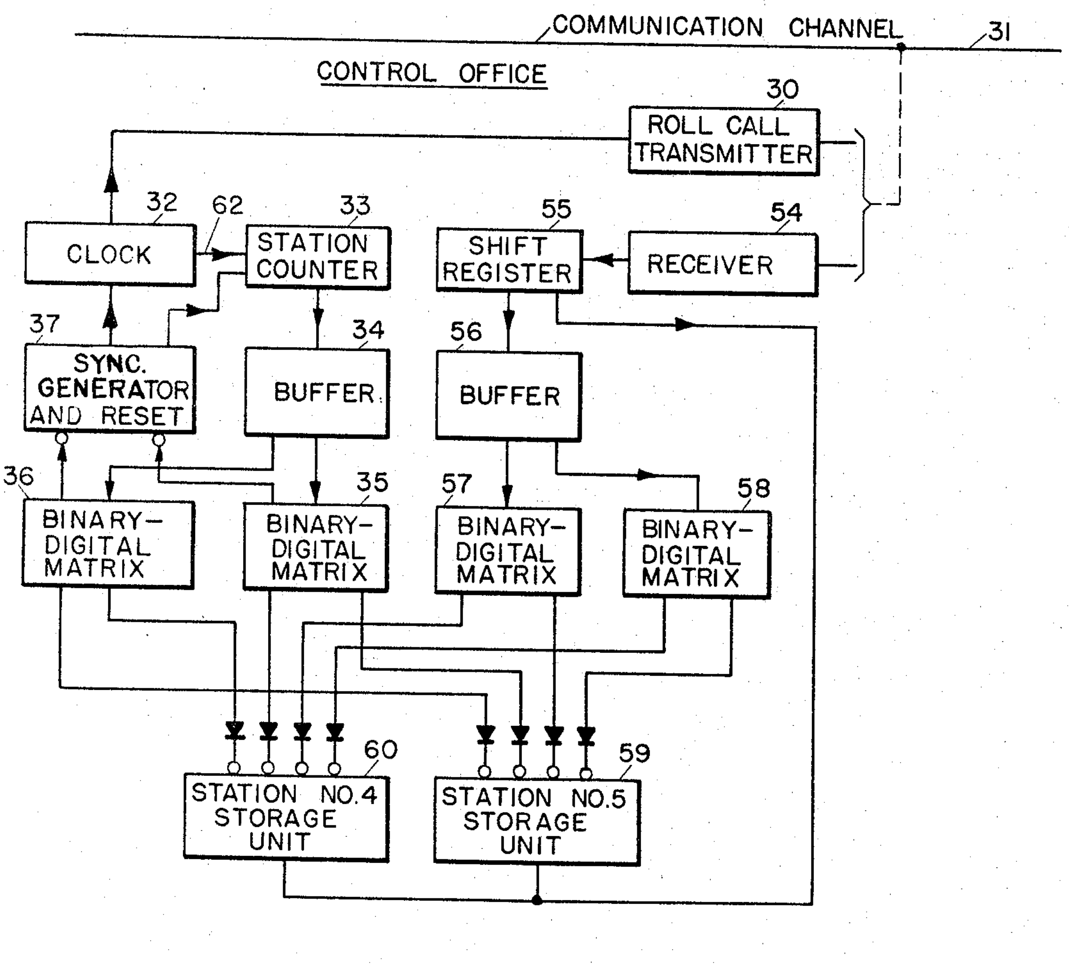

This invention relates to code communication systems of the multiple station type, and it more particularly pertains to a code communication system of the roll call type for the communication of indications of the conditions of devices at a plurality of field stations to a control office.

Such a system has utility, for example, in a centralized traffic control system for railroads, a pipeline system, and the like, where it is desirable to scan repeatedly the conditions of devices at each of several field stations which are remotely located relative to a control office.

The system according to the present invention provides a solid state code communication system for the communication of indications over a suitable communication channel from a plurality of field stations to a control office. The communication channel may be, for example, communication by selected high and low shift carrier frequencies applied to a line circuit.

Roll call pulses are transmitted from the control office in repeated cycles separated by synchronizing pulses, one pulse being transmitted in each scanning cycle for each field station. The roll call pulses are separated by time spaces during which the station last called transmits an indication code to the control office. The roll call pulses are counted at the control office and at each field station by a binary counter. The stages of the binary counter are divided into a plurality of groups, and each group of stages has associated therewith a binary to digital matrix for registering the part of the count that is made by the associated stages of the binary counter. Each matrix at each of the field stations provides inhibit energization to maintain the transmitter at that station inactive until a predetermined count is registered by the associated stages of the binary counter. Thus the transmitter at each field station is maintained inactive until inhibit energy is removed from the matrix associated with each of the groups of stages of the counter at that station. The counter at the control office operates in a similar manner to prevent registration of indications for any field station until the count is reached by the counter at the control office corresponding to that station.

The transmission of indication codes from a field station to a control office is normally inhibited by an output of the matrix of each group of counter stages. It is rendered effective to transmit indications only when inhibit energy is removed from the output of the matrices belonging to all of the groups of binary stages of the counter at that station. This condition is established only when the count to which that particular station is assigned in the roll call system is reached during the scanning of the stations.

To check the identity of the station transmitting indications with the identity registered at the control office, the first group of characters transmitted from a field station to the control office comprises a station registration code corresponding to the roll call code assigned to that station. This station code is fed into a shift register at the control office and is compared with the code registered at the control office as corresponding to the station being called before the indication codes that are received can be applied to an indication storage unit belonging to the indication station that is transmitting.

An object of the present invention is to provide a solid state code communication system wherein a roll call binary counter is divided into groups of stages for control of respective diode converting matrices in order to register the station being called.

Another object of the present invention is to provide means for registering a station call dependent upon removal contemporaneously of inhibiting energy by each of a plurality of binary to digital matrices at a given station.

Another object of the present invention is to permit the control of an indication storage unit at the control office only when it is checked that the station transmitting corresponds to the station last called by removing energy from each of a plurality of inhibit control wires controlling the actuation of the indication storage unit.

Other objects, purposes and characteristic features will be in part obvious from the accompanying drawings and in part pointed out as the description of the invention progresses.

Figure 1B:
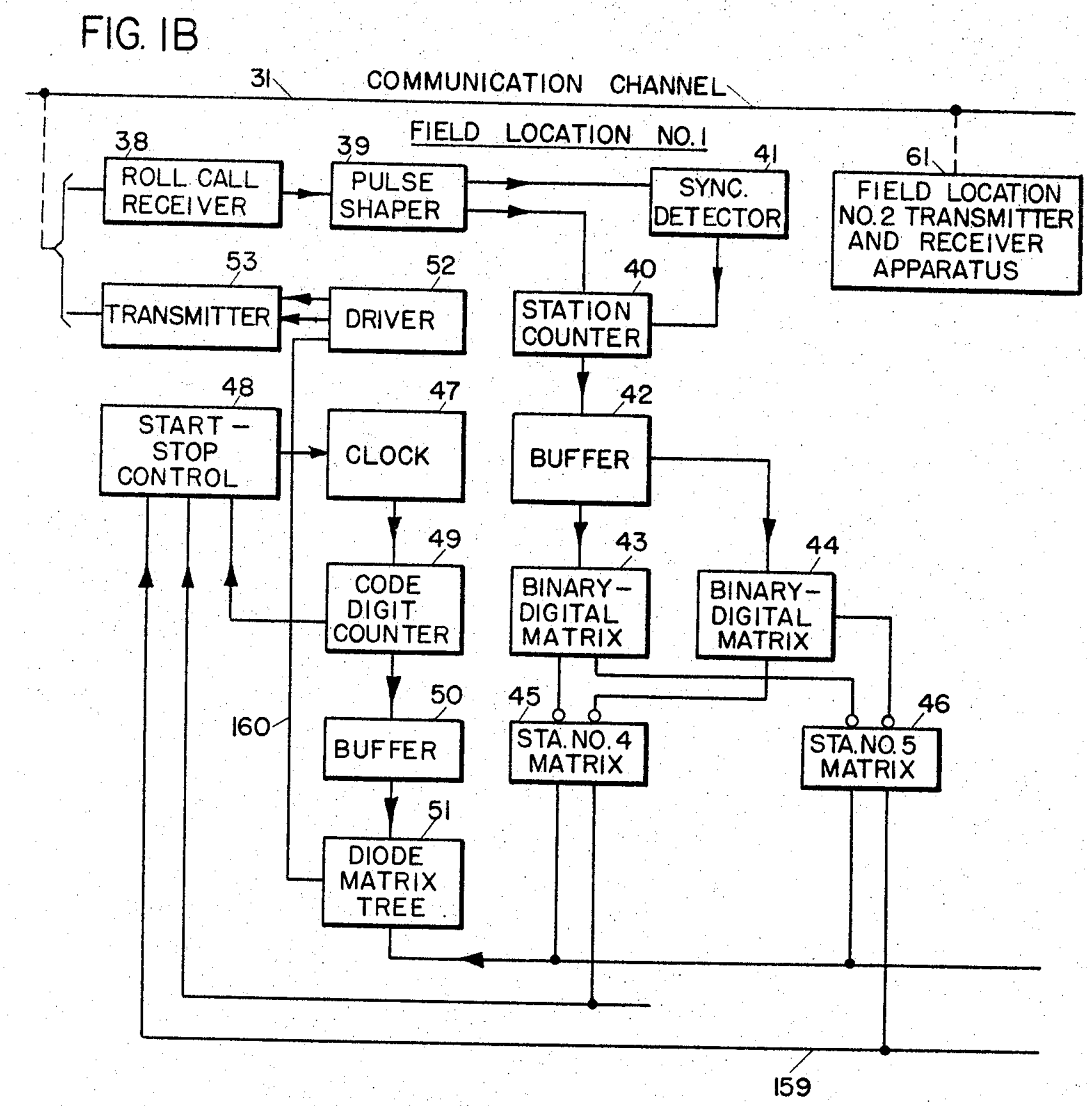
Figure 2A:
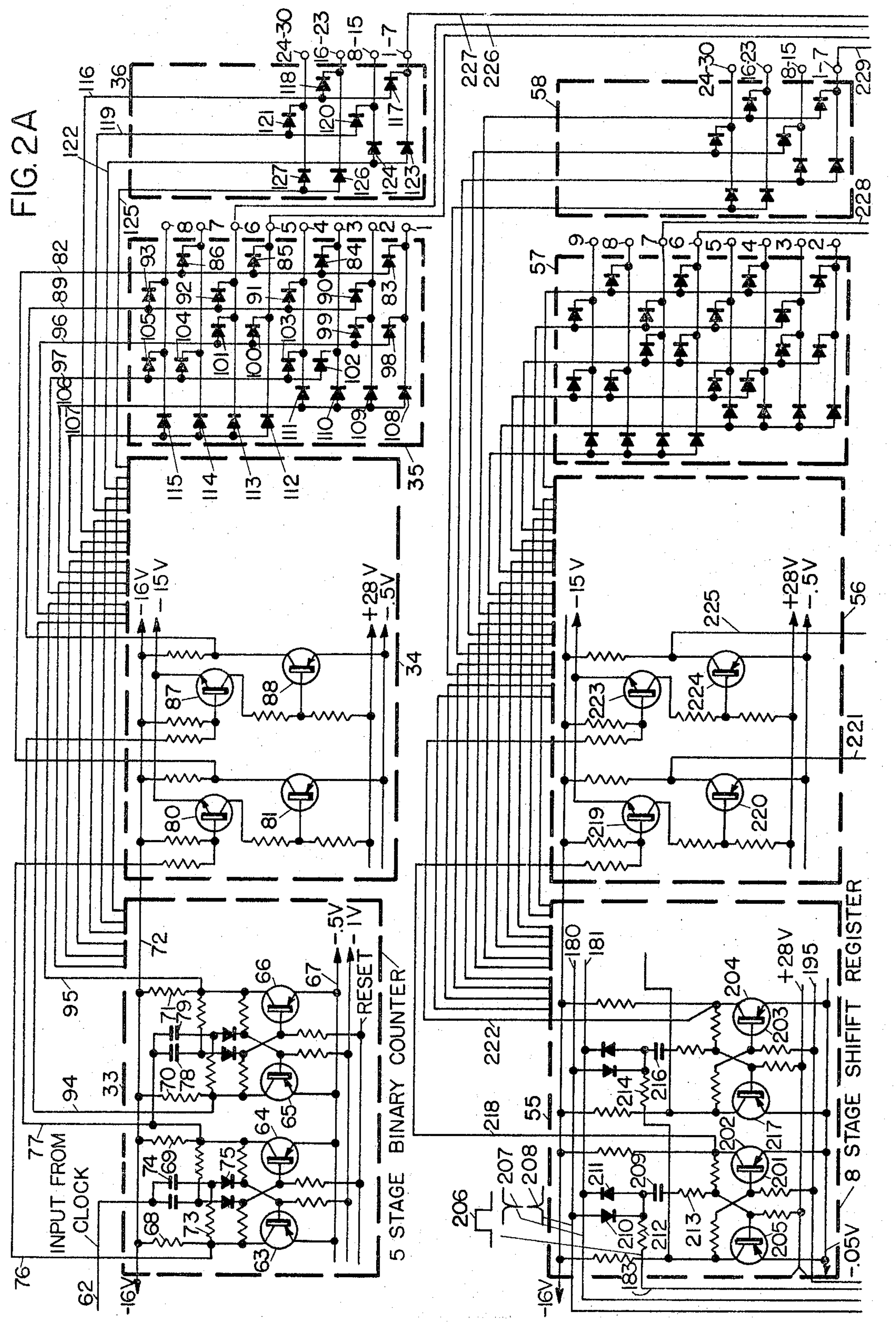
Figure 2B:
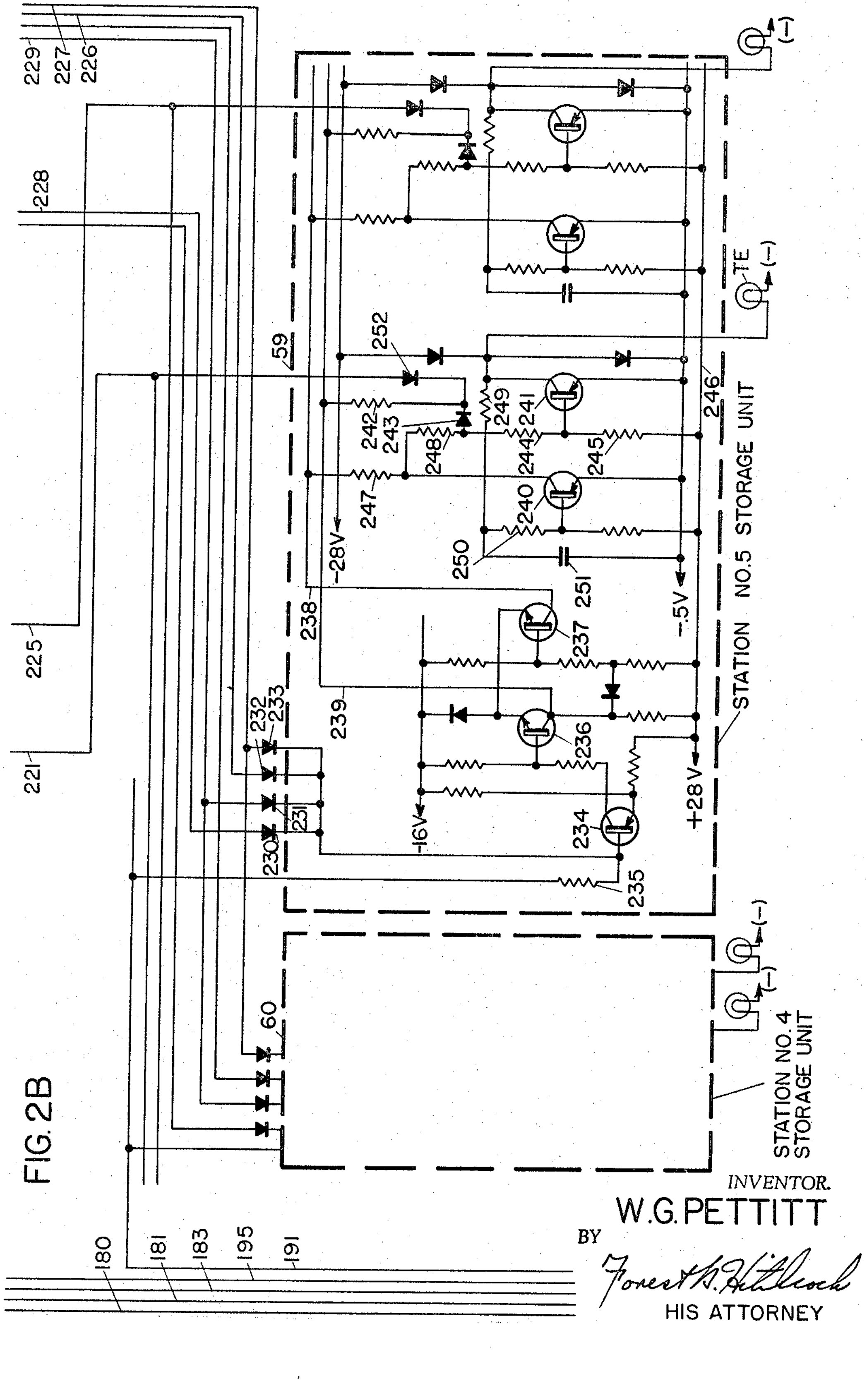
Figure 2C:
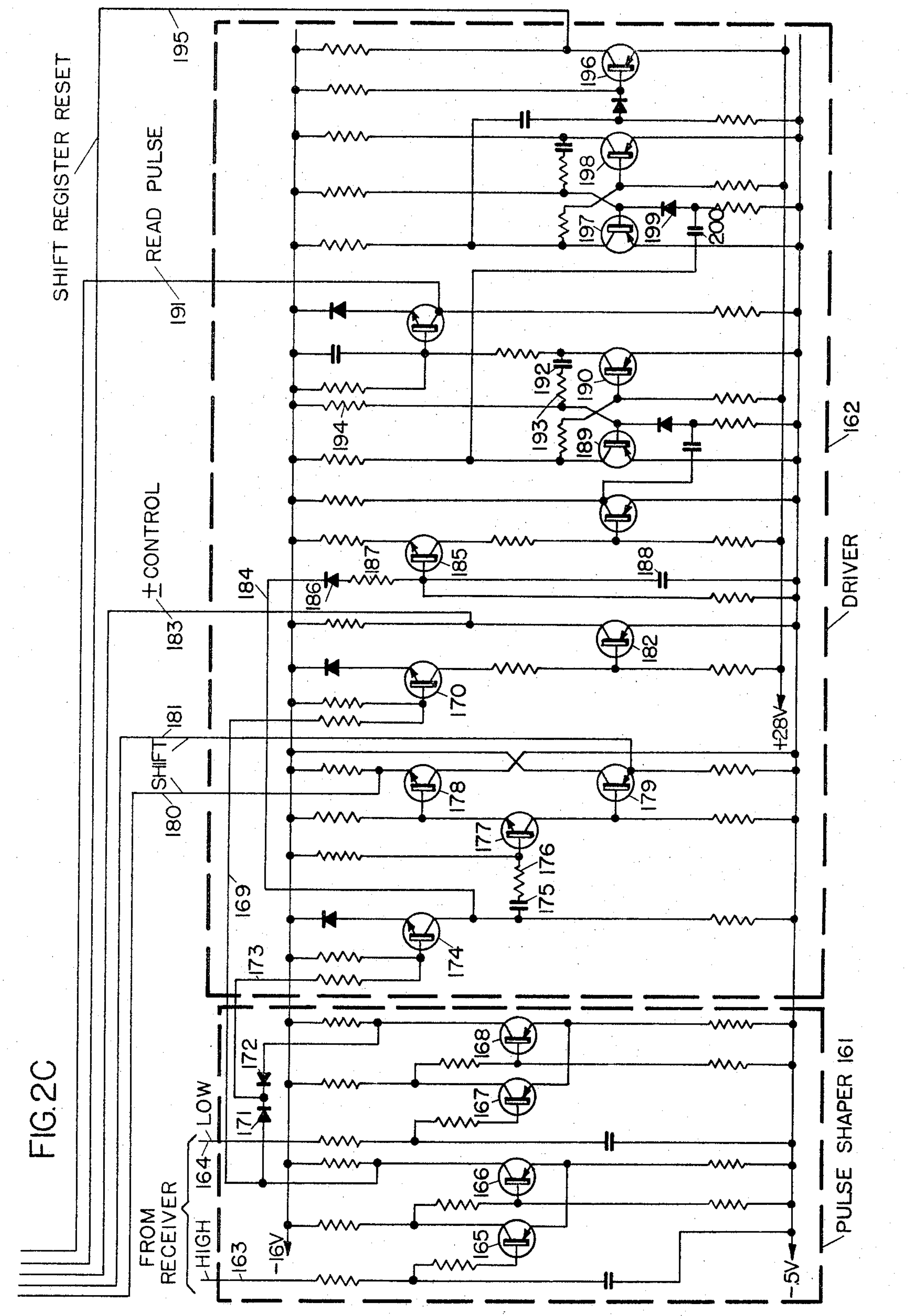
Figure 3:
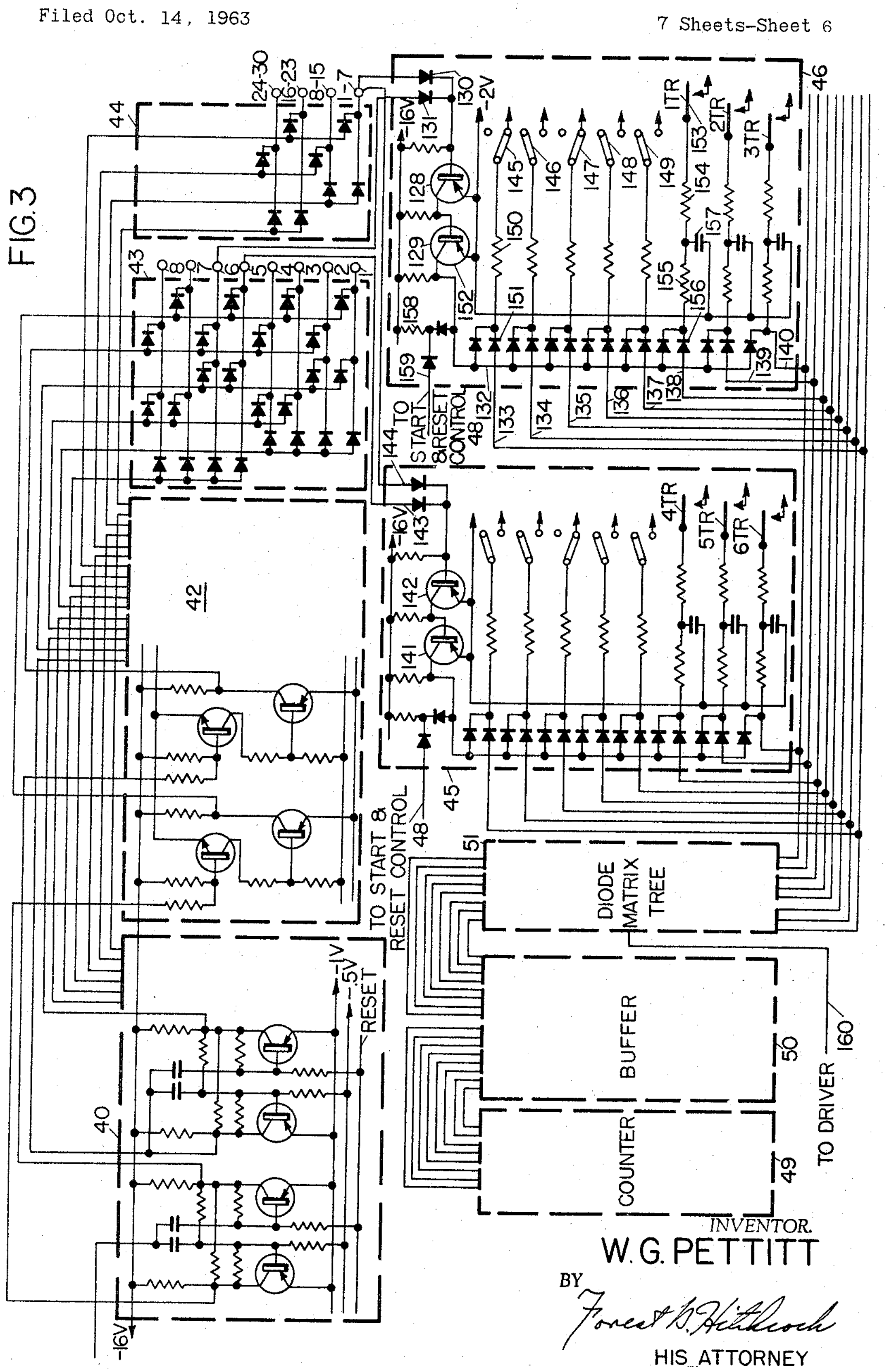

In decreasing the invention in detail, reference is made to the accompanying drawings, wherein corresponding parts in the several figures are identified by corresponding reference characters, and wherein:

FIGS. 1A and 1B when placed side by side constitute a block diagram illustrating the organization of a solid state code communication system provided according to the present invention;

FIGS. 2A, 2B and 2C when placed one above the other illustrate digital circuit organizations for certain elements of the system shown in FIG. 1 that are employed at the control office;

FIG. 3 illustrates in detail roll call receiving apparatus and transmitting apparatus at a typical field location corresponding to certain blocks of the block diagram illustrated in FIG. 1; and FIG. 4 is a station connection table.

With reference to FIGS. 1A and 1B, the system is illustrated as having roll call transmittting means at the control office including a Roll Call Transmitter 30 which transmits roll call pulses at a rate determined by a Clock 32 over a suitable Communication Channel 31. The pulses transmitted are counted by a Station Counter 33 at the control office. The respective stages of the Station Counter 33 have outputs which are applied through a suitable Buffer 34 to binary to digital matrices 35 and 36, the outputs of certain stages of the Counter 33 being applied to Binary to Digital Matrix 35 and the outputs of the other stages being applied to Binary to Digital Matrix 36.

After a pulse has been transmitted from the control office for each of the field stations, the binary to digital matrices 35 and 36 provide an output for resetting purposes. Thus, after the total count has been made by the Station Counter 33 a Sync, Generator and Reset 37 generates a synchronizing pulse and resets the Station Counter 33.

At each of the field locations, a Roll Call receiver 38 (see FIG. 1B) is provided for receiving the roll call pulses and applying them through a suitable Pulse Shaper 39 to a Station Counter 40. A Sync Detector 41 is also controlled by an output of the Pulse Shaper 39, and it is effective to reset the Station Counter 40.

Outputs of the respective stages of the Station Counter 40 are applied through a suitable Buffer 42 to binary-digital matrices. Some of the stages are applied to the Binary-Digital Matrix 43, and the other stages are applied to the Binary-Digital Matrix 44. An output of each of the matrices 43 and 44 is applied to a Sta. No. 4 Matrix 45 to normally inhibit transmission of indications associated with the station until a particular station count is reached belonging to that station. Similarly, a Sta. No. 5 Matrix 46 is provided at field location No. 1, and this matrix is normally inhibited from transmitting indications because of outputs of both of the binary digital matrices 43 and 44. A station matrix 45 or 46 can be rendered active for the transmission of indications only when no inhibit energy is applied to that matrix by either the binary-digital matrices 43 or 44.

A Clock 47 is provided at each field location for governing the rate of transmission of an indication code from that field location. The Clock 47 has associated therewith a Start-Stop Control 48. Pulses generated by the Clock 47 are counted by a Code Digit Counter 49, the respective stages of which govern through a suitable Buffer 50 a Diode Matrix Tree 51 for scanning successively the respective station code and indication channels of an indication cycle. The Diode Matrix Tree 51 controls a Driver 52 selectively in accordance with indication codes which are determined for transmission by the station matrices 45 and 46. The Driver 52, in turn, controls a Transmitter 53 which transmits the indication code pulses, preferably as selected high and low shift frequencies over the communication channel 31 to the control office. A series of pulses transmitted from a field location to the control office comprises a first group of pulses identifying the station that is transmitting the indications, and the second group of pulses are indicative of indications which are being communicated from that particular station.

The indication code pulses are received at the control office by a Receiver 54, which, after shaping the pulses as desired provides an output indicative of the high and low shift frequencies respectively that have been received. The Receiver 54 also includes suitable shift drive and read pulse generating means comprising the Pulse Shaper 161 and Driver 162 of FIG. 2C. A Shift Register 55 is provided at the control office for registering the successive code characters that are received from the field stations and storing such characters until an entire indication cycle has been received.

The first part of an indication cycle that is received at the control office has its characters indicative of the station which is transmitting indications as has been heretofore pointed out, and the shift register stages storing such code characters are connected through a Buffer 56 to binary-digital matrices 57 and 58 which are comparable to the matrices 35 and 36 that have been heretofore described as being connected with registration of the station that is being called by the roll call system. More specifically, the Binary-Digital Matrix 57 is controlled by certain stages of the shift register 55 and the Binary-Digital Matrix 58 is controlled by certain other stages of the shift register.

The Station No. 5 Storage Unit 59 as provided at the control office for storing the indications that are received from Station No. 5 at location No. 1 and similarly Station No. 4 Storage Unit 60 is provided for storing indications that are received from Station No. 4 at location No. 1. The control of both of these storage units is inhibited as long as there is an output of either of the binary-digital matrices 35, 36, 57 or 58. In other words, either of these storage units 59 or 60 is controlled in response to the indication station code being received at the control office only provided that the station code received corresponds to the assoicated station, and only provided that it is registered by the binary-digital matrices 35 and 36 that this is the station that is called by the roll call transmitting apparatus. When a storage unit is selected by the removal contemporaneously of inhibit energy from all four wires connected to that storage unit from the binary-digit matrices, that unit is rendered effective by generation of a read pulse to have respective storage stages in the unit controlled in accordance with codes stored in the Shift Register 55 for a group of indication code characters that have been received during the indication cycle after the reception of the station code.

With reference to FIG. 1B, Field Location No. 2 Transmitting and Receiving Apparatus 61 is illustrated for field location No. 2. It is to be understood that this apparatus can be comparable to that which is disclosed more in detail associated with field location No. 1.

Having thus described the organization of the system in general, the invention will be further described with reference to typical circuits and operating conditions.

With reference to FIG. 2A, typical stages of the five stage Binary Counter 33 at the control office are illustrated. This counter is controlled by an input from the Clock 32 at the control office over wire 62. The first and second stages of the Binary Counter 33 are illustrated in detail, the first stage comprising transistors 63 and 64, and the second stage including the transistors 65 and 66. The emitter terminals of these transistors are connected to a common bus 67 which in turn is connected to a suitable source of energy such as —.5 v. The collector terminals of the transistors 63, 64, 65 and 66 are connected through respective load resistors 68, 69, 70 and 71 to a bus 72, which in turn is connected to a suitable source of negative potential such as —16 v. A resistor 73 is connected at one end to the collector of transistor 63 and at the other end to a junction point between a capacitor 74 and a diode 75 in an input circuit which is connected to the base of transistor 63. The resistor 73 is part of a conventional steering circuit for the counter. It is to be understood that a similar circuit is provided for each of the other transistors of the counter. An output wire 76 of the first stage of the counter is connected to the collector of transistor 63, and similarly another output wire 77 of the first stage of the counter is connected to the collector of transistor 64. The base of each transistor is also connected through a resistor to a suitable source of bias energization. The output wire 77 of the first stage of the counter is coupled by capacitors 78 and 79 to the second stage of the Station Counter 33.

The Station Counter 33 is actually a plurality of bistable multivibrators which are switched in a binary manner to count a number of successive pulses applied to the input of the counter equal to two raised to the power of the number of stages.

The output wires of the respective stages of the Binary Counter 33, such as the wires 76 and 77 are connected through a suitable Buffer 34 to the diode matrices 35 and 36. The output on wire 76, for example, of the first stage of the binary counter 33, is applied through buffer transistors 80 and 81 over wire 82 to the diode Matrix 35. Wire 82 is connected in matrix 35 to output terminals 1, 3, 5 and 7 of that matrix through diodes 83, 84, 85 and 86 respectively. Similarly, the output on wire 77 of the first stage of the Binary Counter 33 is connected through buffer transistors 87 and 88 to an input wire 89 of the diode Matrix 35, which in turn is connected within the matrix 35 to output terminals 2, 4, 6 and 8 of that matrix through diodes 90, 91, 92 and 93 respectively.

Similarly, outputs applied to wires 94 and 95 of the second stage of the Binary Counter 33 are applied through suitable buffer stages of the buffer 34 to input wires 96 and 97 of the diode Matrix 35. Wire 96 is connected through diodes 98, 99, 100 and 101 to the output terminals 1, 2, 5 and 6 respectively of the Matrix 35. The input wire 97 is connected through diodes 102, 103, 104 and 105 to matrix output terminals 3, 4, 7 and 8 respectively of Matrix 35.

The third stage of the Binary Counter 33 has its output wires applied through Buffer 34 to the input wires 106 and 107 respectively of the diode Matrix 35. The wire 106 is connected through diodes 108, 109, 110 and 111 to the matrix output terminals 1, 2, 3 and 4 respectively of Matrix 35. Similarly, the input wire 107 is connected through diodes 112, 113, 114 and 115 to the matrix output terminals 5, 6, 7 and 8 respectively of Matrix 35.

The outputs of the last two stages of the Binary Counter 33 are applied through the Buffer 34 to the diode Matrix 36. Thus, the output wire 116 associated with the fourth stage of the binary counter 33 is applied as an input to the diode Matrix 36, and is connected in this Matrix 36 through diodes 117 and 118 to output terminals 1–7 and 16–23 respectively. Wire 119, which is associated with one of the output wires of the fourth stage of the Binary Counter 33, is applied as an input to the Matrix 36, and it is connected through diodes 120 and 121 to output terminals 8–15 and 24–30 respectively of the Matrix 36. Wire 122 is associated with the output of the last stage of the Binary Counter 33 and it is connected through diodes 123 and 124 in the Matrix 36 to the matrix output terminals 1–7 and 8–15 respectively. Wire 125 is energized as the second output wire of the last stage of Binary Counter 33, and it is connected through diodes 126 and 127 in the Matrix 36 to the terminals 16–23 and 24–30 respectively.

As a result of this circuit organization that has been described, the output terminals of the matrices 35 and 36 are used in combination according to the table shown in FIG. 4 to register the calling of respective stations. Station No. 5, for example, is registered by the output of the matrices in accordance with the removal of energy from the terminal 6 of the Matrix 35 at the same time that energy is removed from the terminal 1–7 of the Matrix 36. This condition exists only upon the counting of the fifth pulse of the roll call scanning cycle corresponding to station No. 5. Similarly, station No. 4, for example, is registered in response to the transmission of the fourth pulse by the lack of energization of the terminal 5 of the Matrix 35 at the same time that there is no energization of the terminal 1–7 of the Matrix 36.

With reference to FIG. 3, it is illustrated that the roll call pulses received at a typical field location are counted by a Station Counter 40 corresponding to the Station Counter 33 at the control office that has been described in detail. The matrices 43 and 44 at the typical field location are similar to the matrices 35 and 36 at the control office which have been described in detail, the matrices 43 and 44 of FIG. 3 being controlled through a suitable Buffer 42 corresponding to the Buffer 34 at the control office. It ist herefore considered unnecessary to describe in detail the operation of the roll call receiver at the field station because this roll call receiver is operable similar to that which has been described in detail relative to the registration in the matrices 35 and 36 at the control office of the counts corresponding to the respective stations. It is to be understood that the respective stations at each location are connected to the matrices 43 and 44 at the associated location according to the table of FIG. 4 which specifies the terminal numbers to which connection is made for the respective stations. Although this table only shows the connections for the first 16 stations of a roll call cycle, it should be readily apparent how this table is further expanded to cover the terminal connections that would be required for other stations.

The Matrix 46 is associated with station No. 5, and it includes an electronic switch comprising transistors 128 and 129 which is normally maintained in an on position in accordance with inhibiting positive energization received from either or both of the matrices 43 and 44. The output terminal 1–7 of the Matrix 44 is connected to the base of the transistor 128 through a diode 130. The terminal 6 of the Matrix 43 is also connected to the base of transistor 128 through diode 131. In accordance with this connection, the transistor 128 is normally turned off and the transistor 129 is normally turned on. With the transistor 129 normally turned on, the bus 132 is normally energized with positive polarity, which prevents the application of negative energy to the wires 133 through 140 by the Matrix 46. The Matrix 46 selects codes for transmission from station No. 5.

It is to be understood that the Matrix 45 which is associated with selecting the codes for transmission relative to station No. 4, is controlled similar to the control that has been described for the Matrix 46 in that its output is normally suppressed by the transistor 141 which is normally turned on. The transistor 142 is normally turned off, and it is turned on when station No. 4 is selected to transmit in accordance with the deenergization contemporaneously of the wires 143 and 144 which are connected respectively to terminal 5 of Matrix 43 and terminal 1–7 of Matrix 44 in accordance with the table of FIG. 4.

Inasmuch as the first five elements of an indication cycle, according to this embodiment of the present invention, are used for station code transmission, the wires 133 through 137 associated with the Matrix 46 are selectively energized or not with a negative potential in accordance with the positions of code jumper 145 through 149 respectively. Thus, if station No. 5 is called by the roll call code, the wire 133 is energized with negative potential through jumper 145, resistor 150 and diode 151. When station No. 5 is not selected to transmit, because of the transistor 129 being turned on, there is a shunt circuit applied through diode 152 preventing negative energization of the wire 133. Wire 135 becomes energized in a similar manner in accordance with the position of code jump 147.

The indications transmitted from station No. 5 have been illustrated as including indications of the conditions of track occupancy relays 1TR, 2TR and 3TR respectively. It is to be understood, however, that indications of conditions of other devices can as well be transmitted. The transmission of an indication of the condition of the relay 1TR is accomplished, for example, by the selective deenergization or energizaion with negative polarity of the wire 138. If the relay 1TR is in its dropped away position when the field station No. 5 is transmitting, the wire 138 becomes energized with negative potential through back contact 153 of relay 1TR, resistor 154, resistor 155, and diode 156. A capacitor 157 is connected to the junction point between resistors 154 and 155 for the purpose of noise suppression. Similiarly, contacts of each of the other relays TR are selectively connected to similar channel wires.

The turning off of the transistor 129 when the station No.5 is selected to transmit, changes the potential drop across the load resistor 158, and thus renders the Clock 47 effective to drive the Code Digit Counter 49 by a change in the degree of energization of the start and reset control wire 159 (see FIGS. 1B and 3). A similar start is made upon the selection of station No. 4 to transmit, or upon the selection of any other station at the associated location.

The Diode Matrix Tree 51 is a conventional type matrix tree wherein energy is selectively applied or not to the output wire 160 as the respective channels of an input to the matrix tree are scanned by the Counter 49. Thus, for the first step of the indication cycle, for example, if negative energy is supplied to wire 133, this is applied through the Diode Matrix Tree 51 to wire 160. If, however, the code jumper 145 were actuated to its other position, no energy would be applied to wire 133 during the first step of the indication cycle, and thus at this time, the wire 160 would be deenergized. This wire is connected to the Driver 52 (see FIG. 1B), and it produces one output or another of the Driver 52 in accordance with whether or not energy is applied to wire 160. Thus, one character or another is transmitted by the Transmitter 53 during each step of an indication cycle in accordance with whether or not there is any energy applied to wire 160.

The Buffer 50 is connected between the Counter 49 and the Diode Matrix Tree 51 to prevent the counter from being actuated by noise. The Buffer 42 is provided for the same purpose to protect against operation of the Station Counter 40 by noise.

At the control office, the Receiver 54 (see FIG. 1A), in addition to including tone receiving means, includes a Pulse Shaper 161 (see FIG. 2C) and a Driver 162 (see FIG. 2C). Input wires 163 and 164 to the Pulse Shaper 161 are respectively energized with pulses in accordance with the reception of high and low shift frequency pulses over the Communication Channel 131 by the Receiver 54. A Schmitt trigger is used for shaping the pulses received over wire 163 comprising the transistors 165 and 166, and similarly a Schmitt trigger is used for forming the pulses applied to the input wire 164 comprising transistors 167 and 168. The output of the first Schmitt trigger is applied from the collector of transistor 166 over wire 169 to the base of transistor 170 in the Driver 162. The presence or the absence of a pulse on this wire during the respective digits of a code being received as indicative of the reception of a high or a low shift frequency respectively. The outputs of both of the Schmitt triggers are combined through diodes 171 and 172 to provide an output of the Pulse Shaper 161 over wire 173 to the Driver 162, which output has a pulse for each digit of the code being received, irrespective of character. These pulses are applied to an inverting amplifier comprising transistor 174, the collector of which is coupled through capacitor 175 and resistor 176 to a split load driver comprising transistors 177, 178 and 179. This driver provides outputs from the transistors 178 and 179 to wires 180 and 181 respectively. These outputs provide simultaneously positive and negative spike pulses respectively for each digit of the code being received. These pulses are used in driving the Shift Register 55.

As has been heretofore pointed out, only pulses corresponding to one character that is received are applied to the wire 169 which is connected to the base of transistor 170. The transistors 170 and 182 are controlled by the pulses of wire 169 so as to provide an output on wire 183 for each digit of the code being received from the field station, this output being of a positive polarity for the high frequency shift characters received, for example, and being of negative polarity for the low shift characters being received. The pulses applied to output wire 183 of the driver 162 are used for controlling the Shift Register 55.

The output of transistor 174, which provides a pulse for each bit of the code, is applied over wire 184 to the base of transistor 185 through diode 186 and resistor 187. This control furnishes a charge for the capacitor 188 for each bit of the code until all of the bits of the indication cycle have been received. At this time, because of the discharging of the capacitor 188, the output applied to the collector of transistor 185 goes negative, and this is effective through a multivibrator including transistors 189 and 190 to initiate a read pulse which is applied over wire 191 to the storage units. A capacitor 192 is connected between the collector of transistor 190 and the base of transistor 189 through resistor 193. The capacitor 192, together with the resistor 194 which is connected to the base of transistor 189, constitute a circuit for determining the time constant of the read-out pulse which is applied over the wire 191 to the storage units.

Reset control is provided over the reset control wire 195 which is connected to the collector of transistor 196. The transistor 196 is normally on, and this transistor is turned off by a multivibrator comprising transistors 197 and 198 which are controlled when reset is required in accordance with the connection of the base of transistor 197 through diode 199 and capacitor 200 to the collector of transistor 189. The shift register 55 is reset in accordance with the turning off of transistor 196 as a result of the output on wire 195 becoming less positive.

*Shift register*

With reference to FIG. 2A, the Shift Register 55 for registering at the control office the characters received during an indication cycle, has been illustrated as being an eight stage shift register, although it is to be understood that the number of stages varies in accordance with the requirements of practice. Only the first and second stages of the Shift Register 55 have been illustrated for the purpose of simplifying the disclosure.

The Shift Register 55 is reset at the end of each indication cycle by a reset pulse applied to wire 195 in a manner which has been described. This pulse is applied through resistor 201 to the transistor 202 of the first stage and similarly through the resistor 203 of the transistor 204 of the second stage. This turns on the transistors 202 and 204 so that the right hand transistor of each stage is on at the beginning of an indication cycle. The transistor 205 of the first stage of the Shift Register 55 is controlled in accordance with the input that is applied to the input wire 183. This input can be a positive pulse such as the pulse 206, or it can be a negative pulse. At the end of this input pulse, the wires 180 and 181 furnish simultaneously positive and negative pulses 207 and 208 respectively. The wires 180 and 181 are connected to a capacitor 209 through diodes 210 and 211 respectively. The input wire 183 is also connected to the same side of the capacitor 209 through resistor 212. The other side of the capacitor 209 is connected through a resistor 213 to the base of transistor 205.

The transistor 205 is controlled in accordance with the charge existing on the capacitor 209 at the end of an input pulse. Thus, if the input pulse is (+), the capacitor 209 receives a (+) charge through the resistor 212, and this charge causes a flow of current through the resistor 213 when the wires 180 and 181 becomes energized at the end of the pulse of a polarity to turn the transistor 205 on. Similarly, if the input pulse is of a negative polarity, the charge on the capacitor 209 is such as to cause the transistor 205 to be turned off at the end of the input pulse. If the transistor 205 is turned on, the transistor 202 becomes turned off.

The second stage of the Shift Register 55 is controlled by an input connection extending from the collector of transistor 205, through resistor 214 to capacitor 216. The capacitor 216 is thus charged with a positive or negative polarity in accordance with whether transistor 205 is turned on or turned off, and transistor 217 is selectively turned on or turned off by capacitor 216 in the same manner that transistor 205 has been described as being turned on or turned off by the capacitor 209. The turning on of the transistor 217 in response to a positive input to the second stage of the Shift Register 55 turns off the transistor 204.

An output of the first stage of the Shift Register 55 is applied to wire 218 which is connected to the collector of transistor 202. This output is connected through a buffer stage of the Buffer 56 including transistors 219 and 220 to provide an input for the storage units 59 and 60. This input is provided over wire 221 which is connected to the collector of transistor 220 of the Buffer 56. Similarly, the output of the second stage of the Shift Register 55 is applied over wire 222 which is connected to the collector of transistor 204 through a buffer stage including transistors 223 and 224 to the storage units 59 and 60. The output of the Buffer 56 which corresponds to the output of the second stage of the Shift Register 55, is applied to wire 225 which is connected to the collector of transistor 224.

*Indication storage units*

There is an indication storage unit at the control office for each of the stations, the storage units 59 and 60 (see FIGS. 1A and 2B) having been illustrated as being provided for storage of indications transmitted from stations 5 and 4 respectively. One of these storage units is conditioned at the end of each indication cycle in accordance with the condition of respective stages of the Shift Register 55, provided that the associated station has been called.

After the full complement of an indication code has been received, a read pulse is generated and applied to wire 191 (see FIG. 2C) in a manner which has been described, and this read pulse is applied in multiple to all of the station storage units to render such units selectively responsive to the code stored by the Shift Register 55 in accordance with the particular station that has been called. It has been pointed out the station call is registered at the control office by the condition of energization of the output wires of the matrices 35 and 36. Similarly, matrices 57 and 58, which are constructed to correspond with the matrices 35 and 36, are controlled by the last five stages of the Shift Register 55, which stages store, at the time of reading out of the Shift Register 55, the first five code elements that have been received during the indication cycle, these elements corresponding to station identification of the particular field station that is transmitting.

Before a station storage unit such as unit 59 can be controlled in accordance with the condition of the Shift Register 55 at the end of an indication cycle, it must be checked that the station code received corresponds to the code of the station being called by the roll call transmitter at the control office. It will be noted that the output terminals of the matrices 35 and 36 and 57 and 58 are numbered to correspond with the output terminals of similar matrices 43 and 44 at the field locations, and thus the connections of the indication storage units to the matrices is made on the same basis that has been described relative to the selection of connections for the respective stations according to the table of FIG. 4. Therefore, the Matrix 35 at the control office which corresponds to the Matrix 43 at the field station has its output terminal No. 6 connected to Storage Unit 59 for station No. 5, and the Matrix 36 has its output terminal 1–7 also connected to the Storage Unit 59 for station No. 5. These connections are made over wires 226 and 227 respectively. Similar terminals on matrices 57 and 58 are also connected over wires 228 and 229 respectively to the storage unit 59 for station No. 5. These four wires are connected through diodes 230 through 233 respectively to the base of a transistor 234 in the Storage Unit 59.

The requisite for turning on the transistor 234 to render the conditioning of the Storage Unit 59 effective is that inhibit energization must be removed contemporaneously from all four of the wires coming from the matrices at the time when a read pulse is applied to wire 191, which is also connected to the base of transistor 234 through a resistor 235.

Transistors 236 and 237 form a switching organization wherein the transistor 237 is normally turned on and provides negative energization for a bus 238 which is effective to maintain the respective indication storages of the Storage Unit 59 in their last actuated positions. The transistor 237 is turned off and the transistor 236 is turned on to permit the reading into the respective indication storages. When this switching takes place, negative energy is applied to the bus wire 239 at the time when a read pulse is generated to render the Storage Unit 59 responsive to the code that is stored in the Shift Register 55.

A typical indication storage is illustrated for the control of a track occupancy indicator lamp TE in FIG. 2B. This storage unit comprises transistors 240 and 241 and associated control apparatus which is effective to store the last indication received for the control of the indicator lamp TE. If the last indication transmitted for the control of the indicator lamp TE is a condition that the associated track section at field station No. 5 is unoccupied, the transistor 241 is actuated to its off position and the transistor 240 is turned on. Assuming these conditions to exist, it will be further assumed that an indication is received during an indication cycle from field station No. 5 that the track section to have its indication displayed by the lamp TE has become occupied. In accordance with this condition, the stage of the Shift Register 55 corresponding to this track indication is actuated so as to have a negative output applied on the wire 221 at a time when the read in pulse is provided on wire 191 at the end of an indication cycle. As has been heretofore pointed out, the presence of a read pulse on wire 191 turns transistor 237 off and transistor 236 on so that negative energization is applied to wire 239. Such energization turns transistor 241 on in accordance with the energization of a circuit extending from wire 239 through resistor 242, diode 243, resistor 244, and resistor 245 to a bus 246 which is connected to (+) 28 v. The base of transistor 241 is connected midway between resistors 244 and 245 in the circuit just described, and thus this transistor is turned on when negative energy is applied to the bus 239 during read in except when (+) energization is applied over wire 21 from the Shift Register 55. The indicator lamp TE is connected to the collector of transistor 241, and this is turned on in accordance with the turning on of the transistor 241 to indicate that the associated track section at field station No. 5 has become occupied.

At the end of the read pulse, which is applied to the base of transistor 234, the transistor 234 is restored to its normally turned off position, and in accordance therewith the switch including transistors 236 and 237 is actuated so as to turn on transistor 237 and to turn off transistor 236. This applies negative energization to the bus 238 and disconnects negative energization from the bus 239. The negative energization of bus 238 is applied through resistor 247 to the collector of transistor 240, and thus maintains the transistor 241 in its turned on position because of the base of transistor 241 being connected to the collector of transistor 240 through resistor 248 and resistor 244. The transistor 240 is in its off position under these conditions because of the connection of the collector of transistor 241 through resistors 249 and 250 to the base of transistor 240. The resistor 250 together with capacitor 251 provides a noise suppression circuit to prevent the possibility of the storage unit being erroneously actuated when the switching takes place by the transistor 236 and 237.

The indicator lamp TE will remain energized until an indication is received from the field station No. 5 that the associated track section has become unoccupied, and in accordance with this condition, positive energization is applied to wire 221 at the end of the cycle by the Shift Register 55, and this positive energization is applied through diode 252 to a junction point with diode 243 so that the transistor 241 beomes turned off when a read pulse is applied to wire 191. In accordance with the turning off of transistor 241 in response to the (+) pulse received over wire 221 from Shift Register 55, the indicator lamp TE becomes extinguished. The transistor 240 is turned on because of the transistor 241 having been turned off when its control circuit is established upon the transistor 237 being turned on to switch to the normal condition of negative energization of the bus 238.

Having thus described in detail how an indication received for the control of the indicator lamp TE is stored by an associated storage in the Storage Unit 59, it is to be understood that a similar mode of operation is provided for the storage of each of the other indications that is transmitted to the control office.

Having thus described a specific code communication system as one embodiment of the present invention, it is to be understood that the present invention is not limited for the specific form shown, and that various adaptations, alterations and modifications may be applied to the specific form shown to meet the requirements of practice, except as limited by the scope of the appending claims.

What I claim is:

1. A code communication system for the communication of indications of the conditions of devices over a communication channel connecting a plurality of field stations to a control office comprising:
(a) roll call pulse transmitting means at the control office for transmitting successive pulses over the communication channel to in turn call the several stations,
(b) receiving means at each station for receiving the pulses communication over the communication channel from the control office,
(c) a binary counter at each of the field stations for counting the roll call pulses received, said binary counter having several stages,
(d) a binary to digital converter diode matrix for each of a plurality of groups of stages of said binary counter for registering digits counted by said groups of stages respectively,
(e) code transmitting means at each of the field stations operable when rendered effective to transmit indication codes over the communication channel to the control office, and
(f) means at each station including all of said matrices at that station for normally inhibiting said code transmitting means and for rendering said code transmitting means effective only when predetermined digits of all of said diode matrices for that station are registered contemporaneously.

2. A code communication system according to claim 1 wherein each of the matrices has a plurality of normally energized output terminals and wherein the deenergization of any single one of the output terminals is indicative of a particular count made by the stages of the counter with which the matrix is associated.

3. A code communication system according to claim 2 wherein a binary electronic switch is provided at each station to control transmission by that station, and means is provided for actuating the switch to render said code transmitting means effective for that station in response to the contemporaneous deenergization of one particular output terminal of each of said matrices.

4. A code communication system for the communication of indications of the conditions of each of several groups of devices at a particular field location remote from a control office comprising:
(a) a communication channel connecting the field location and the control office,
(b) transmitting means at the control office for transmitting successive roll call pulses over said communication channel,
(c) counting means at said location having a plurality of stages for counting the roll call pulses transmitted over said channel from the control office,
(d) a plurality of groups of devices at said location to to have their positions indicated at the control office,
(e) transmitting means at the location for transmitting codes selected by each of the devices of a selected group, and
(f) group selecting means at said particular field location controlled by said counting means for selecting the transmission of indications of the conditions of the different groups of devices, one group at a time, in accordance with the counting of roll call pulses received over said communication channel from the control office by said counting means.

5. A code communication system according to claim 4 wherein said group selecting means includes a plurality of solid state matrices and means for controlling the matrices respectively by different groups of stages of said counter, and wherein a group of devices at said station is selected to govern codes transmitted from that station only when predetermined output terminals of said matrices are contemporaneously deenergized.

References Cited

UNITED STATES PATENTS

| | | | |
|---|---|---|---|
| 2,740,106 | 3/1956 | Phelps | 340—163 X |
| 2,812,504 | 11/1957 | Phelps | 340—147 |
| 3,223,977 | 12/1965 | David et al. | 340—163 |
| 3,244,805 | 4/1966 | Evans et al. | 340—163 |
| 3,308,433 | 3/1967 | Lochinger | 340—166 |

JOHN W. CALDWELL, *Primary Examiner.*

NEIL C. READ, *Examiner.*

D. J. YUSKO, *Assistant Examiner.*